March 6, 1962 G. E. HULLINGER 3,024,051
REMOTE COUPLING MECHANISM
Filed May 25, 1960
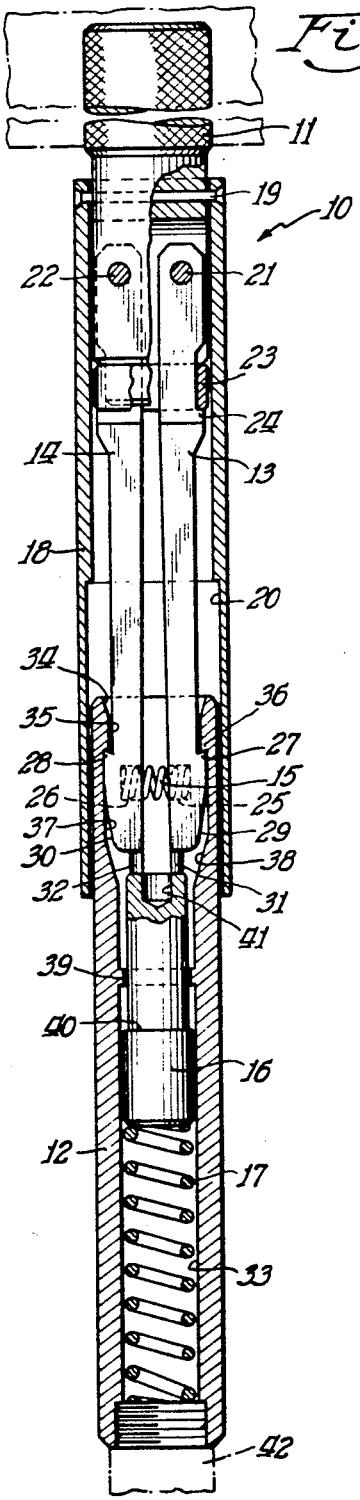
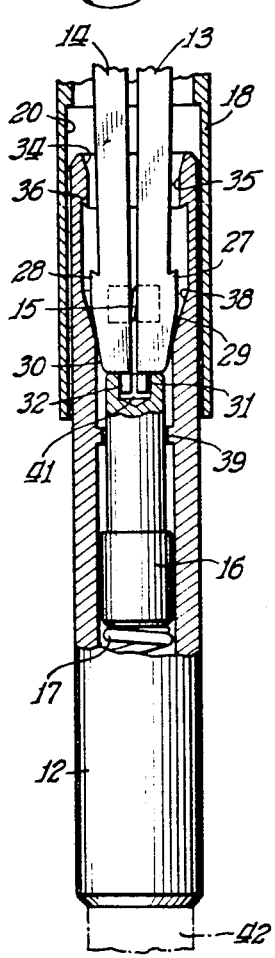
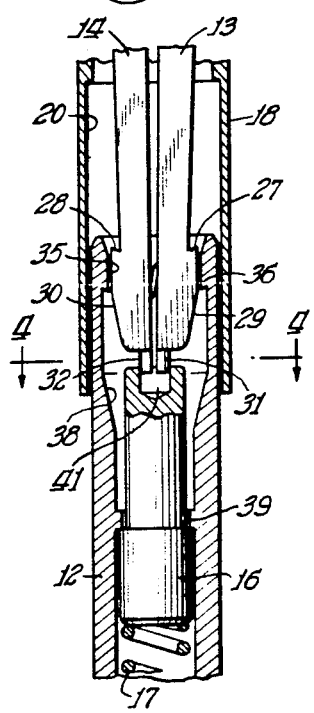
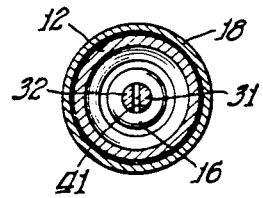
Inventor:
Golden E. Hullinger
By Ray E. Snyder
Atty.

United States Patent Office 3,024,051
Patented Mar. 6, 1962

3,024,051
REMOTE COUPLING MECHANISM
Golden E. Hullinger, Decatur, Ill., assignor to Borg-Warner Corporation, Chicago, Ill., a corporation of Illinois
Filed May 25, 1960, Ser. No. 31,636
4 Claims. (Cl. 287—115)

This invention relates to a remote coupling mechanism for axially connecting one shaft to another.

The present coupling has been designed particularly for coupling a control rod of a nuclear reactor to its related drive mechanism, which must be done remotely because of inaccessibility and possible hazard to personnel. The coupling of the present invention may, however, be used advantageously in any application where remote coupling is necessary.

It is an object to provide a coupling mechanism for axially interconnecting two shafts that may be coupled and uncoupled remotely by axial movement of one shaft with respect to the other.

It is an additional object to provide a remote coupling mechanism for axially connecting together two shafts and that may be coupled and uncoupled at will without manually resetting any part of the mechanism.

It is a more particular object to provide a coupling mechanism comprising two longitudinally extending hooks or hangers that are pivotally mounted in one shaft and biased apart by spring means, interlocking means formed within the second shaft and adapted to engage said hangers, means for forcing the two hangers radially inward by axial movement of one shaft with respect to the other, and means for holding the hangers engaged for a limited axial motion so as to permit uncoupling of the hangers from the second shaft.

The invention consists of the novel constructions, arrangements, and devices to be hereinafter described and claimed for carrying out the above-stated objects and such other objects as will appear from the following description of a preferred form of the invention, illustrated with reference to the accompanying drawings, wherein:

FIG. 1 is a longitudinal sectional view of the remote coupling mechanism of the present invention;

FIG. 2 is a partial sectional view of FIG. 1 in one stage of operation;

FIG. 3 is a view similar to FIG. 2 in another stage of operation; and

FIG. 4 is a view taken on line 4—4 of FIG. 3.

Like characters of reference designate like parts in the several views.

Referring to FIG. 1, there is illustrated the improved coupling mechanism designated generally by the numeral 10. The mechanism 10 comprises a drive shaft 11, a driven sleeve or shaft 12, a pair of hooks or hangers 13 and 14 attached to the drive shaft 11, a bias spring 15 for forcing the hangers 13 and 14 radially apart, a locking plunger 16, and a spring 17. A guide sleeve 18 is attached to the drive shaft 11 by means of a transverse pin 19 and is formed on its interior with a longitudinal bore 20 for receiving the shaft 12. The hangers 13 and 14 are pivotally attached to the drive shaft 11 by pins 21 and 22, respectively. A retaining ring 23 surrounds the hangers 13 and 14 and limits their radial outward movement under the influence of the bias spring 15. An external shoulder 24 formed on the hangers 13 and 14 prevents longitudinal movement of the retaining ring 23. The hangers 13 and 14 are formed with recesses 25 and 26, respectively, for retaining the spring 15. The hangers 13 and 14 are also formed with respective notched shoulders 27 and 28, tapered external surfaces 29 and 30, and longitudinal extensions 31 and 32 of reduced diameter.

The sleeve 12 is formed with a central bore 33 in which is contained the locking plunger 16 and spring 17. The sleeve 12 is also formed on one end with a tapered or flared opening 34, a cylindrical bore 35 adjacent the flared opening 34, an annular notched shoulder 36 for engaging the shoulders 27 and 28 on the hangers 13 and 14, respectively, an enlarged cylindrical bore 37, and a tapered internal surface 38 adjacent the central bore 33. The bores 33, 35, and 37 are of successively increasing diameters. The locking plungers 16 is formed with an annular shoulder 40 adapted to abut against a shoulder 39 formed within the sleeve 12, and with an axial central bore 41 for receiving the longitudinal extensions 31 and 32 of the hangers 13 and 14.

The driven sleeve 12 is adapted to be threaded or otherwise connected to a control rod 42. The spring 17 is disposed under compression within the bore 33 and tends to force the locking plunger 16 axially upward, as shown.

The coupling mechanism 10 may be assembled and operated as follows:

The sleeve 12 containing the spring 17 and locking plunger 16 are attached to the control rod 42. The retaining ring 23 is placed around the hangers 13 and 14 and they are then attached to the drive shaft 11. The guide sleeve 18 is attached to the drive shaft 11 by means of the pin 19 and the mechanism is then assembled and ready to be coupled to the driven shaft 12.

The drive shaft 11 is moved axially into contact with the driven shaft 12 which is received within the bore 20 of the sleeve 18. The tapered surfaces 29 and 30 on the hangers 13 and 14 contact the tapered opening 34, and the hangers 13 and 14 are squeezed together against the action of the spring 15. As the tapered surfaces 29 and 30 slide through the bore 35, the extensions 31 and 32 come in contact with the end of the locking plunger 16. The plunger 16 is forced axially inward against the action of the spring 17 until the shoulders 27 and 28 move past the annular shoulder 36 on the interior of the shaft 12. The spring 15 forces the hangers 13 and 14 radially apart and the shoulders 27 and 28 engage the shoulder 36 for thereby coupling shaft 11 to the shaft 12.

To uncouple the two shafts, the drive shaft 11 is forced inwardly or downwardly, as shown in FIG. 2, until the tapered surfaces 29 and 30 contact the internal surface 38. The hangers 13 and 14 are again squeezed together against the action of the spring 15 until the extensions 31 and 32 enter into the axial bore 41 of the plunger 16. The locking plunger 16 holds the hangers 13 and 14 together while the drive shaft 11 is being retracted until the tapered surfaces 29 and 30 have passed into the bore 35, as shown in FIG. 3. When the locking plunger 16 abuts against the shoulder 39, the extensions 31 and 32 are removed from the bore 41, and the hangers 13 and 14 expand outwardly under the influence of the spring 15. The hangers 13 and 14 are then in the condition initially described and can be recoupled to the driven shaft 12 when desired.

There has been provided by this invention, an improved coupling mechanism for remotely connecting together two shafts by axial motion of one shaft with respect to the other. When coupled together, the force of gravity acting on the shaft 12 is effective to retain the two shafts in locked engagement. The coupling mechanism is coupled and uncoupled by a simple axial motion and is automatically conditioned for recoupling without any additional manual operation.

It is to be understood that the invention is not to be limited to the specific constructions and arrangements shown and described, except only insofar as the claims may be so limited, as it will be understood to those skilled in the art that changes may be made without departing from the principles of the invention.

I claim:
1. In a coupling mechanism for axially coupling together two shafts, the combination of a pair of hooks or hangers attached to one shaft, interlocking means formed on the second shaft for engaging said hangers, resilient means for biasing said hangers radially outward, compressing means formed on the second shaft for forcing said hangers radially inward a limited amount against the action of said resilient means for engaging the hangers with the interlocking means, additional compressing means formed on the second shaft for forcing the hangers together a greater amount upon axial inward movement of one shaft with respect to the other, and locking means for holding said hangers compressed together for permitting uncoupling of the hangers from said second shaft.

2. In a coupling mechanism for axially coupling together two shafts, the combination of a pair of hooks or hangers attached to one shaft, interlocking means formed on the second shaft for engaging said hangers, resilient means for biasing said hangers, radially outward, retaining means attached to said hangers for limiting the radial outward movement thereof, first compressing means formed on the second shaft for forcing said hangers radially inward a limited amount for engaging the hangers with said interlocking means, second compressing means also formed on the second shaft for forcing the hangers together a greater amount upon axial inward movement of one shaft with respect to the other, and locking means for holding said hangers compressed together upon axial outward movement of one shaft with respect to the other for permitting uncoupling of the hangers from said second shaft.

3. In a coupling mechanism for axially coupling together two shafts, the combination of a pair of hooks or hangers attached to one shaft, interlocking means formed on the second shaft for engaging said hangers, resilient means for biasing said hangers radially outward, retaining means surrounding said hangers for limiting the radial outward movement thereof, a guide sleeve surrounding said hangers and attached to said one shaft and adapted to receive said second shaft, first compressing means formed on the second shaft and effective to force said hangers together a limited amount upon axial inward movement of one shaft with respect to the other for engaging the interlocking means, second compressing means also formed on said second shaft for forcing said hangers together a greater amount upon further inward axial movement of one shaft with respect to the other, and locking means resiliently retained within said second shaft and effective to hold said hangers compressed together during axial outward movement of one shaft with respect to the other for thereby permitting uncoupling of said hangers from said second shaft.

4. In a coupling mechanism for axially coupling together two shafts, the combination of a pair of hooks or hangers attached to one shaft; interlocking means formed on the interior of said second shaft for engaging the hangers; a spring disposed between said hangers for forcing them radially outward; a retaining ring surrounding said hangers and limiting the radial outward movement thereof; first compressing means including a tapered annular surface formed on one end of the second shaft for squeezing the hangers together a limited amount upon being inserted into the second shaft; second compressing means including an annular tapered surface formed on the interior of the second shaft and adapted to compress the hangers together a greater amount upon further axial inward movement of the hangers with respect to the second shaft, locking means for holding the hangers together including a longitudinal extension on the end of each of said hangers, and a locking plunger formed with an axial bore for receiving the extensions; spring means disposed within said second shaft and adapted to force said locking plunger axially outward; and stop means formed on the interior of said second shaft for limiting the axial outward movement of said locking plunger for thereby releasing the longitudinal extensions of said hangers and permitting uncoupling of the hangers from said second shaft.

References Cited in the file of this patent

UNITED STATES PATENTS

| | | |
|---|---|---|
| 1,005,699 | Engle | Oct. 10, 1911 |
| 1,815,660 | Walker | July 21, 1931 |
| 2,381,657 | Eksergian et al. | Aug. 7, 1945 |
| 2,555,836 | Werich | June 5, 1951 |

FOREIGN PATENTS

| | | |
|---|---|---|
| 537,236 | France | Feb. 28, 1922 |